United States Patent
Liu et al.

(10) Patent No.: US 11,082,178 B2
(45) Date of Patent: Aug. 3, 2021

(54) MESSAGE SENDING METHOD AND DEVICE, ELECTRONIC DEVICE

(71) Applicant: ZTE CORPORATION, Guangdong (CN)

(72) Inventors: Kun Liu, Shenzhen (CN); Bo Dai, Shenzhen (CN); Zhaohua Lu, Shenzhen (CN); Xianming Chen, Shenzhen (CN); Zhifeng Yuan, Shenzhen (CN); Wei Cao, Shenzhen (CN); Chunlin Yan, Shenzhen (CN)

(73) Assignee: ZTE Corporation, Guangdong (CN)

( * ) Notice: Subject to any disclaimer, the term of this patent is extended or adjusted under 35 U.S.C. 154(b) by 0 days.

(21) Appl. No.: 16/484,098

(22) PCT Filed: Feb. 6, 2018

(86) PCT No.: PCT/CN2018/075368
§ 371 (c)(1),
(2) Date: Aug. 6, 2019

(87) PCT Pub. No.: WO2018/141301
PCT Pub. Date: Aug. 9, 2018

(65) Prior Publication Data
US 2019/0356440 A1    Nov. 21, 2019

(30) Foreign Application Priority Data

Feb. 6, 2017    (CN) .......................... 201710067282.0

(51) Int. Cl.
*H04L 5/00*    (2006.01)
*H04L 27/26*    (2006.01)
(Continued)

(52) U.S. Cl.
CPC ........ *H04L 5/0048* (2013.01); *H04L 27/2613* (2013.01); *H04W 72/0446* (2013.01); *H04W 72/1205* (2013.01)

(58) Field of Classification Search
CPC ... H04L 5/00; H04L 27/2613; H04L 27/2611; H04L 5/0048; H04W 72/0446; H04W 72/1205; H04W 72/12
See application file for complete search history.

(56) References Cited

U.S. PATENT DOCUMENTS

2012/0208545 A1    8/2012    Yang et al.
2015/0289292 A1*   10/2015   Sun .................... H04L 27/2646
                                                              370/329
(Continued)

FOREIGN PATENT DOCUMENTS

CN    102158901 A    8/2011
CN    104144467 A    11/2014
(Continued)

OTHER PUBLICATIONS

International Search Report of corresponding PCT Application No. PCT/CN2018/075368—5 pages (dated May 2, 2018).

Primary Examiner — Yemane Mesfin
Assistant Examiner — Henry Baron
(74) Attorney, Agent, or Firm — Knobbe, Martens, Olson & Bear, LLP (57) ABSTRACT

Provided are a message sending method and device, and an electronic device. The method includes: sending, by a first node, a message to a second node, wherein the message includes at least one of: a first reference signal carried on a first resource, or a data packet carried on a second resource; wherein the first reference signal belongs to a first reference signal set, and the first resource belongs to a first resource set; the second resource belongs to a second resource set;

(Continued)

and the first resource set and the second resource set have a gap in a time domain, and the value of the gap is greater than or equal to 0.

20 Claims, 4 Drawing Sheets

(51) Int. Cl.
*H04W 72/04* (2009.01)
*H04W 72/12* (2009.01)

(56) References Cited

U.S. PATENT DOCUMENTS

| 2015/0373673 | A1 | 12/2015 | Lyu et al. |
| 2016/0270058 | A1* | 9/2016 | Furuskog .......... H04W 72/0413 |
| 2017/0332381 | A1 | 11/2017 | Lyu et al. |
| 2017/0339722 | A1 | 11/2017 | Jiao |

FOREIGN PATENT DOCUMENTS

| CN | 104335534 A | 2/2015 |
| CN | 104981022 A | 10/2015 |
| CN | 105530706 A | 4/2016 |
| WO | 2012/112320 A1 | 8/2012 |

* cited by examiner

A first node sends a message to a second node, where the message includes at least one of: a first reference signal carried on a first resource or a data packet carried on a second resource; where the first reference signal belongs to a first reference signal set, and the first resource belongs to a first resource set; the second resource belongs to a second resource set; and the first resource set and the second resource set have a gap in a time domain, and the value of the gap is greater than or equal to 0   110

MESSAGE SENDING METHOD AND DEVICE, ELECTRONIC DEVICE

CROSS REFERENCE TO RELATED APPLICATION

This is a National stage application, filed under 37 U.S.C. 371, of International Patent Application NO. PCT/CN2018/075368, filed on Feb. 6, 2018, which claims the priority to a Chinese patent application NO. 201710067282.0 filed on Feb. 6, 2017, disclosures of which are incorporated herein by reference in their entirety.

TECHNICAL FIELD

The present disclosure relates to the field of communications and, for example, to a message sending method and device, and an electronic device.

BACKGROUND

With the rise of intelligent terminals and the enrichment of wireless data application traffics, data users in a wireless communication system have greatly increased, and data content is no longer limited to a traditional text or image. In the future, users have more and more requirements on multimedia traffics such as high-definition videos, mobile TVs and the like, causing an explosive growth of wireless network flow. According to the forecast of market organization, in the next 10 years, wireless data traffics will increase 500 to 1000 times and increase 1.6 to 2 times annually on average, which puts higher requirements on network capacity of the wireless communication system.

In the future, the mobile Internet traffic and the Internet of Things traffic will become the main driving force for the development of the mobile communication. The 5th Generation (5G) mobile communication system will meet requirements for diversified traffics in various areas such as residence, work, recreation and transportation. Even in scenarios such as dense residential areas, offices, stadiums, open-air gatherings, subways, expressways, high-speed rails and wide-area coverage places which are characterized by ultra-high flow density, ultra-high connection density and ultra-high mobility, the 5G mobile communication system may also provide users with excellent traffic experience such as ultra-high definition videos, virtual reality, augmented reality, cloud desktops, online games and the like. Meanwhile, the 5G will permeate into the Internet of Things and various industries and deeply integrate with industrial facilities, medical instruments and vehicles, effectively meeting requirements for diversified traffics in vertical industries such as industry, medical treatment and transportation and achieving the "Internet of everything".

The 5G will solve challenges brought by differentiated performance indexes in the diversified application scenarios, the performance challenges faced by different application scenarios are different, and the user experience rate, the flow density, the time delay, the energy efficiency and the connection number may become challenging indexes of different scenarios. From the main application scenarios, traffic requirements and challenges of the mobile Internet and the Internet of Things, four main 5G technical scenarios may be summarized, which are a continuous wide-area coverage scenario, a hot-spot high-capacity scenario, a low-power-consumption high-connection scenario and a low-delay high-reliability scenario.

For the low-power-consumption and high-connection scenario, the challenge is mainly traffics of discontinuous sending of some small data packets. A terminal first performs related operations of system access, and then a base station allocates resources, so as to complete traffic sending or receiving. In the above operation process, it is considered that resource overhead in the traffic sending or receiving process is very small, which may cause the problem that the resource overhead in the access process is too large compared to the traffic overhead.

SUMMARY

The present disclosure provides a message sending method and device, and an electronic device.

The message sending method provided by the present disclosure may include a step described below.

A first node sends a message to a second node, where the message includes at least one of: a first reference signal carried on a first resource, or a data packet carried on a second resource.

In this step, the first reference signal belongs to a first reference signal set, and the first resource belongs to a first resource set; the second resource belongs to a second resource set; and the first resource set and the second resource set have a gap in a time domain, and a value of the gap is greater than or equal to 0.

The message sending device provided by the present disclosure includes a transmission unit.

The transmission unit is configured to send a message to a second node, where the message includes at least one of: a first reference signal carried on a first resource, or a data packet carried on a second resource.

In this transmission unit, the first reference signal belongs to a first reference signal set, and the first resource belongs to a first resource set; the second resource belongs to a second resource set; and the first resource set and the second resource set have a gap in a time domain, and a value of the gap is greater than or equal to 0.

The electronic device further provided by the present disclosure includes a processor and a memory storing computer-executable instructions. When the computer-executable instructions are executed by the processor, the processor is configured to execute following operations.

A message is sent to a second node, where the message includes at least one of: a first reference signal carried on a first resource, or a data packet carried on a second resource.

The first reference signal belongs to a first reference signal set, and the first resource belongs to a first resource set; the second resource belongs to a second resource set; and the first resource set and the second resource set have a gap in a time domain, and a value of the gap is greater than or equal to 0.

The present disclosure further provides a computer-readable storage medium, which is configured to store computer-executable instructions for executing any one of the methods described above.

The present disclosure further provides a computer program product including a computer program stored in a non-transient computer-readable storage medium. The computer program includes program instructions which, when executed by a computer, enable the computer to execute any one of the methods described above.

The message sending method and device and the electronic device provided by the present disclosure may effec-

DETAILED DESCRIPTION

Figure 1:
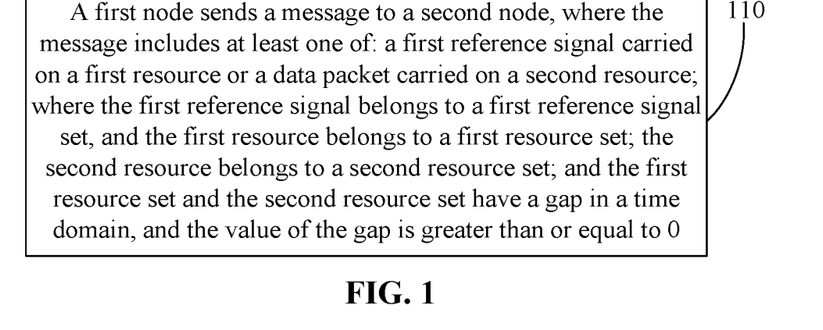
FIG. 1 is a flowchart of a message sending method according to an embodiment of the present disclosure.

FIG. 1 is a flowchart of a message sending method according to an embodiment of the present disclosure. As shown in FIG. 1, the message sending method includes step 110 described below.

In step 110, a first node sends a message to a second node, where the message includes at least one of: a first reference signal carried on a first resource, or a data packet carried on a second resource; where the first reference signal belongs to a first reference signal set, and the first resource belongs to a first resource set; the second resource belongs to a second resource set; and the first resource set and the second resource set have a gap in a time domain, and the value of the gap is greater than or equal to 0.

When the value of the gap is 0, it indicates that the first resource set and the second resource set are continuous in the time domain.

Generally, only after a terminal accesses a base station and the base station allocates resources to the terminal, the terminal may perform traffic data interaction with the base station. For a low-power-consumption scenario having a huge number of terminals, for example for a traffic of discontinuous sending of some small data packets, after the terminal performs related operations of system access, the base station allocates resources to complete traffic sending or receiving. In this process, the problem that the resource overhead in the traffic sending or receiving process is smaller than the resource overhead in the access process may possibly occur. The message sending method provided by this embodiment may implement resource allocation in the system access process, and enable the data transmission to be performed in the access process, thereby improving the data transmission efficiency. For example, in the implementation process of the access of the terminal to the base station, the resource is allocated to the terminal, so as to implement the traffic data sending and receiving of the terminal.

The first resource refers to a time-frequency resource block, which is configured to carry the sending of the first reference signal. Each subset in the first reference signal set may include one or more first reference signals. The first resource set includes one or more first resources. The second resource set includes one or more second resources. The gap refers to a gap from the end time of the first resource set to the start time of the second resource set, and the gap may include one or more gap values.

In an embodiment, before the first node sends the message to the second node, the method further include: configuring the gap between the first resource set and the second resource set in the time domain.

In an embodiment, the gap between the first resource set and the second resource set in the time domain may be configured through at least one of following manners: configured by the first node, configured by the second node, configured according to a predetermined rule or configured by default.

In an embodiment, before the first node sends the message to the second node, the method further includes steps described below.

One or more of the first reference signal sets are configured, where the one or more first reference signal sets are configured through at least one of following manners: configured by the first node, configured by the second node, configured by default or configured according to a predetermined rule.

One or more of the first resource sets are configured, where the one or more first resource sets are configured through at least one of following manners: configured by the first node, configured by the second node, configured by default or configured according to a predetermined rule.

One or more of the second resource sets are configured, where the one or more second resource sets are configured through at least one of following manners: configured by the first node, configured by the second node, configured by default or configured according to a predetermined rule.

In an embodiment, configuration of the gap satisfies at least one of conditions described below.

Gaps corresponding to different first resource sets are independently configured. That is, a gap between each first resource set and the corresponding second resource set in the time domain is independently configured.

When first reference signals sent on the first resources belong to different first reference signal sets, the corresponding gaps are independently configured. That is, when multiple first reference signals are sent on the first resource and the multiple first reference signals belong to different first reference signal sets, gaps between the first resource set to which the first resource belongs and multiple second resource sets in the time domain are independently configured.

When the first resources carrying the first reference signals belong to the same first resource set and the sent first reference signals belong to different first reference signal sets, the corresponding gaps are independently configured. That is, when multiple first resources carrying one or more first reference signals belong to the same first resource set and the one or more carried first reference signals belong to different first reference signal sets, gaps between multiple first resource sets and the corresponding second resource sets in the time domain are independently configured.

When the sent first reference signals belong to the same first reference signal set and the multiple first recourses carrying the first reference signals belong to different first resource sets, the gaps corresponding to different first resource sets and the second resource sets in the time domain are independently configured. That is, when one or more sent first reference signals belong to the same first reference signal set and multiple first recourses carrying the one or more first reference signals belong to different first resource sets, gaps between different first resource sets and the corresponding second resource sets in the time domain are independently configured.

The meaning of independently configured herein is that the gap corresponding to each set is determined without relying on other sets.

In an embodiment, the method further include at least one of: determining location information of the second resource in the second resource set according to the first reference signal in the first reference signal set or index information of the first reference signal; or determining location information of the second resource set according to index information of the first reference signal set. The location information of the second resource set may include a time domain location of the second resource set and a frequency domain location of the second resource set.

In an embodiment, there is a mapping relationship between the first reference signal in the first reference signal set or the index information of the first reference signal and the second resource in the second resource set; and according to the mapping relationship, the location information of the second resource in the second resource set may be determined through the first reference signal or the index information of the first reference signal.

In an embodiment, there is a mapping relationship between the first reference signal set and the second resource set; and according to the mapping relationship, the location information of the second resource set may be determined through the index information of the first reference signal set.

In an embodiment, the first reference signal includes the following contents in the time domain: more than one cyclic prefixes and more than one time domain sequences; or more than one cyclic prefixes, more than one time domain sequences and more than one guard times. Different combinations of different contents included in the first reference signal in the time domain correspond to different sending formats of the first reference signal.

In an embodiment, a length of the gap may be K1 time units, K1≥0, where the time unit may include at least one of following forms:
 a first time unit, where the first time unit includes A1 milliseconds, A1>0;
 a second time unit, where the second time unit includes A2 microseconds, A2>0;
 a third time unit, where the third time unit includes A3 nanoseconds, A3>0;
 a fourth time unit, where the fourth time unit includes a length of B1 time domain symbols, B1>0, where a subcarrier spacing corresponding to the time domain symbols is F1, F1>0; or
 a fifth time unit, where the fifth time unit includes C1 slot lengths, C1>0, where a subcarrier spacing corresponding to a time domain symbol in the slot length is F2, F2>0.

The K1 may be an integer. The slot in the time domain may be composed of multiple time domain symbols and is a basic unit or a minimum unit allocated by the scheduled data in the time domain when the data is scheduled.

In an embodiment, a value of the F1 or the F2 is configured through at least one of following manners: configured by the second node, configured by default, configured by the first node or configured according to a predetermined rule.

In an embodiment, the F1 or the F2 may be configured as 15000 Hz.

In an embodiment, when the first reference signal includes a guard time in the time domain, if a value of the guard time is greater than or equal to a first threshold, a value of K1 is 0.

In an embodiment, when the first reference signal includes a guard time in the time domain, if a value of the guard time is less than or equal to a second threshold, a value of K1 is greater than 0.

In an embodiment, when the first reference signal includes a guard time in the time domain, a value of K1 may be determined according to at least one of: a value of the guard time, a value range of the guard time or a sending format of the first reference signal.

There is a mapping relationship between the value or the value range of the guard time and the value of K1. The mapping relationship may be configured by a standard default or may be sent by the second node to the first node. For example, N values of K1 are defined in advance, and different guard time values or value ranges correspond to different values of the K1.

In an embodiment, the message further includes a second reference signal. The second reference signal is configured to perform at least one of:
 indicating whether the message includes the data packet; or
 serving as a decoding pilot of the data packet.

When the second node detects the second reference signal, it means that the message includes the data packet; while when the second reference signal does not detect the second reference signal, it means that the message does not include the data packet.

In an embodiment, the second reference signal may be selected according to at least one of:
 the first reference signal set;
 an index of the first reference signal set;
 a first reference signal in the first reference signal set or the index information of the first reference signal;
 the first resource set;
 an index of the first resource set; or
 a first resource location in the first resource set or an index of the first resource.

There is a relationship mapping between the second reference signal and the above listed information. The second reference signal may be know through the mapping relationship.

In an embodiment, a resource carrying the second reference signal may be on the second resource.

In an embodiment, the time domain sequence is obtained by scrambling a first sequence through a second sequence, or the time domain sequence is obtained by multiplying the first sequence and the second sequence.

The second sequence may be one of an orthogonal sequence, a quasi-orthogonal sequence or a pseudo-random sequence.

When the message includes multiple first sequences, the second sequences corresponding to different first sequences may be different or the same, or the first sequence is generated according to a default rule or a predetermined rule. When the message includes multiple first sequences, different first sequences are multiplied by one element in the second sequence, and elements by which different first sequences are multiplied in the second sequence may be different or the same, or the first sequence is generated according to a default rule or a predetermined rule.

In an embodiment, the first sequence is at least generated by a third sequence according to a default rule or a predetermined rule.

In an embodiment, the third sequence may be a random access sequence. The random access sequence may be a ZC sequence or an m sequence.

In an embodiment, when the message includes the first reference signal and the data packet, a configuration scheme of the second sequence is different from a configuration scheme of the second sequence when the message includes only the first reference signal.

Alternatively, when the message includes the first reference signal and the data packet, a configuration scheme of the second sequence and a configuration scheme of the second sequence when the message includes only the first reference signal are independently configured. The configuration scheme of the second sequence includes selection of the second sequence, or includes an available second sequence set.

In an embodiment, the time domain sequence may further be generated by a fourth sequence according to a default rule or a predetermined rule.

In an embodiment, the fourth sequence is obtained by scrambling a fifth sequence through a sixth sequence, or the fourth sequence is obtained by multiplying the fifth sequence and the sixth sequence. The second sequence may include one of an orthogonal sequence, a quasi-orthogonal sequence or a pseudo-random sequence. When the message includes multiple fifth sequences, sixth sequences corresponding to different fifth sequences may be different or the same, or the fifth sequence is generated according to a default rule or a predetermined rule. When the message includes multiple fifth sequences, different fifth sequences are multiplied by one element in the sixth sequence, and elements by which different fifth sequences are multiplied in the sixth sequence may be different or the same, or the fifth sequence is generated according to a default rule or a predetermined rule.

In an embodiment, the fifth sequence may be a random access sequence. The random access sequence may be a ZC sequence or an m sequence.

In an embodiment, when the message includes the first reference signal and the data packet, a configuration scheme of the sixth sequence is different from a configuration scheme of the sixth sequence when the message includes only the first reference signal.

Alternatively, when the message includes the first reference signal and the data packet, a configuration scheme of the sixth sequence and a configuration scheme of the sixth sequence when the message includes only the first reference signal are independently configured. The configuration scheme of the sixth sequence includes selection of the sixth sequence, or includes an available sixth sequence set.

In an embodiment, the time domain sequence is obtained by scrambling a first sequence through a second sequence, or the time domain sequence is obtained by multiplying the first sequence and the second sequence, or the time domain sequence is the first sequence. The second sequence includes one of an orthogonal sequence, a quasi-orthogonal sequence or a pseudo-random sequence. When the message includes multiple first sequences, second sequences corresponding to different first sequences may be different or the same, or the first sequence is generated according to a default rule or a predetermined rule. When the message includes multiple first sequences, different first sequences are multiplied by one element in the second sequence, and elements by which different first sequences are multiplied in the second sequence may be different or the same, or the first sequence is generated according to a default rule or a predetermined rule.

In an embodiment, the first sequence is at least generated by the third sequence according to a default rule or a predetermined rule.

In an embodiment, the third sequence may be a random access sequence. The random access sequence may be a ZC sequence or an m sequence.

In an embodiment, when the message includes the first reference signal and the data packet, a configuration scheme of the first sequence is different from a configuration scheme of the first sequence when the message includes only the first reference signal.

Alternatively, when the message includes the first reference signal and the data packet, a configuration scheme of the first sequence and a configuration scheme of the first sequence when the message includes only the first reference signal are independently configured. The configuration scheme of the first sequence includes selection of the second sequence, or includes an available second sequence set.

In an embodiment, the first node may be a terminal, and the second node may be a base station or a transmission node.

In an embodiment, the message may be a random access message.

The above embodiments will be described in conjunction with following application scenarios.

Embodiment 1

In a wireless communication system, the base station configures the resource used for sending a random access message. The random access message includes a random access preamble (Preamble) and a data packet (Data). A gap between the Preamble and the Data in the time domain is configured by the base station or is configured by the terminal or is determined according to a predetermined rule or is configured by default.

Figure 2:
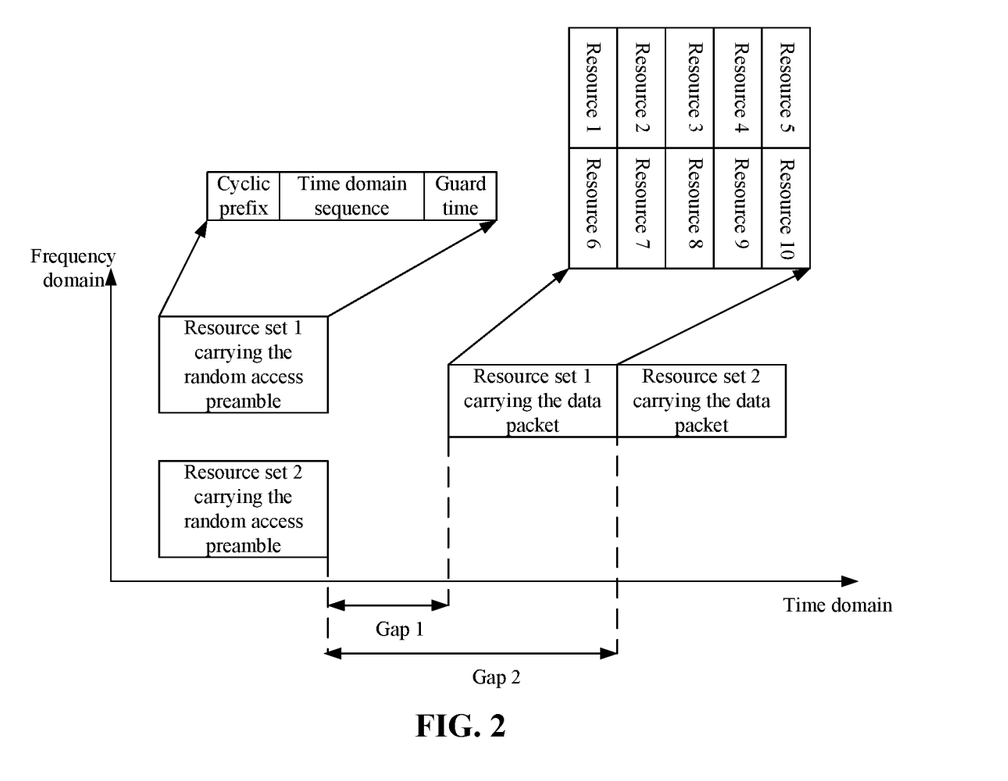
FIG. 2 is a schematic diagram one of random access message resource allocation according to an embodiment of the present disclosure.

As shown in FIG. 2, the base station configures two resource sets for sending Preamble, which are respectively a resource set 1 carrying the random access preamble and a resource set 2 carrying the random access preamble; and the base station configures two resource sets for sending Data, which are respectively a resource set 1 carrying the data packet and a resource set 2 carrying the data packet.

In this embodiment, when the resource set 1 carrying the random access preamble is selected to send the Preamble, the Data is sent in the resource set 1 carrying the data packet, and the gap between the resource set 1 carrying the random access preamble and the resource set 1 carrying the data packet in the time domain is a Gap 1. When the resource set 2 carrying the random access preamble is selected to send the Preamble, the Data needs to be sent in the resource set 2 carrying the data packet, and the gap between the resource set 2 carrying the random access preamble and the resource set 2 carrying the data packet in the time domain is a Gap 2.

In this embodiment, the preamble is composed of a cyclic prefix (CP), a time domain sequence (Sequence) and a guard time (GT). The base station configures ten Preambles (ID1 to ID10) to be sent in the resource set 1 carrying the random access preamble. The resource set 1 carrying the data packet, which is configured by the base station, includes ten resources carrying the data packet, which are respectively a resource 1 to a resource 10. Each resource and each Preamble have a mapping relationship. In this embodiment, the Preamble ID1 corresponds to the resource 1, the Preamble ID 2 corresponds to the resource 2, and so on and so forth.

In this embodiment, a length of the Gap 1 may be a length of K1 (K1 is greater than or equal to 0) slots, and a length of the Gap 2 may be a length of K2 (K2 is greater than or equal to 0) slots.

The slot in the time domain is composed of multiple orthogonal frequency division multiplexing (OFDM) symbols, and the slot is a basic unit or a minimum unit allocated in the time domain when the data is sent.

In an embodiment, if a value of the GT of the Preamble is greater than or equal to a threshold (TH1), the K1 is 0.

Embodiment 2

In a wireless communication system, the base station configures the resource used for sending a random access message. The random access message includes a Preamble and a Data. A gap between the Preamble and the Data in the time domain is configured by the base station or is configured by the terminal or is determined according to a predetermined rule or is configured by default.

Figure 3:
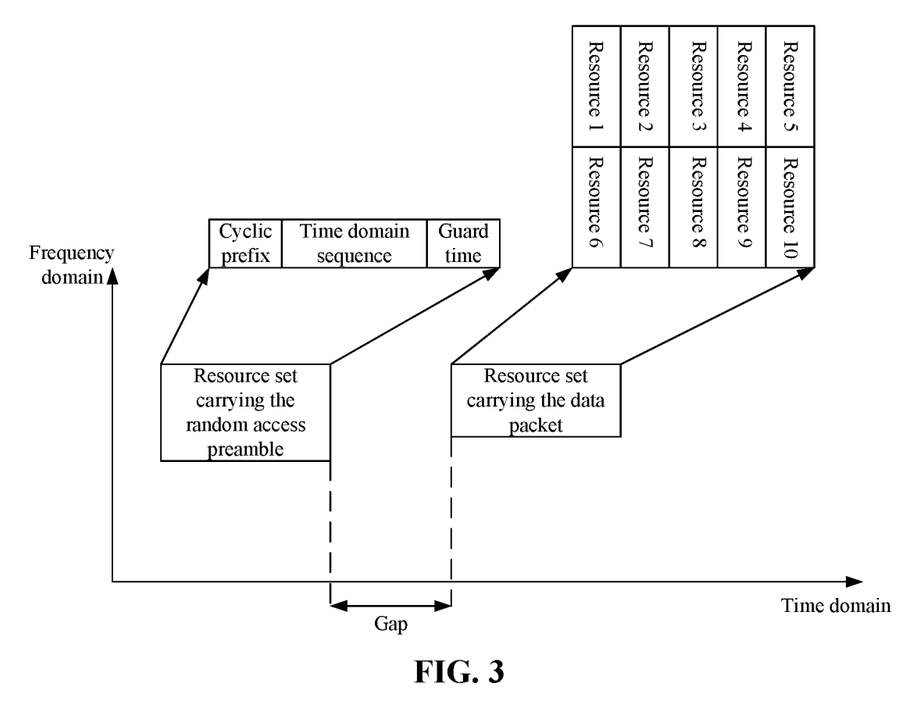
FIG. 3 is a schematic diagram two of random access message resource allocation according to an embodiment of the present disclosure.

As shown in FIG. 3, the base station configures a resource set for sending one Preamble, which is a resource set carrying the random access preamble; and the base station configures a resource set for sending one Data, which is a resource set carrying the data packet.

In this embodiment, when the resource set carrying the random access preamble is selected to send the Preamble, the Data is sent in the resource set carrying the data packet, and the gap between the resource set carrying the random access preamble and the resource set carrying the data packet in the time domain is a Gap.

In this embodiment, the Preamble is composed of a CP, a Sequence and a GT. The base station configures ten Preambles (ID1 to ID10) to be sent in the resource set carrying the random access preamble. The resource set carrying the data packet, which is configured by the base station, includes ten resources carrying the data packet, which are respectively a resource 1 to a resource 10. Each resource and each Preamble have a mapping relationship. In this embodiment, the Preamble ID1 corresponds to the resource 1, the Preamble ID 2 corresponds to the resource 2, and so on and so forth.

The length of the Gap is a length of K (K is greater than or equal to 0) slots. The slot in the time domain is composed of multiple OFDM symbols, and the slot is a basic unit or a minimum unit allocated in the time domain when the data is sent.

The value range of the GT and the value of the K have a certain mapping relationship. The mapping relationship is shown in Table 1, where A, B and C are three thresholds and A>B>C. In this embodiment, the value of the K may be determined from Table 1 according to the value of the GT.

TABLE 1

| Value range of the GT | Value of K |
| --- | --- |
| GT ≥ A | 0 |
| B ≤ GT < A | X1 |

TABLE 1-continued

| Value range of the GT | Value of K |
| --- | --- |
| C ≤ GT < B | X2 |
| GT < C | X3 |

Embodiment 3

Figure 6:
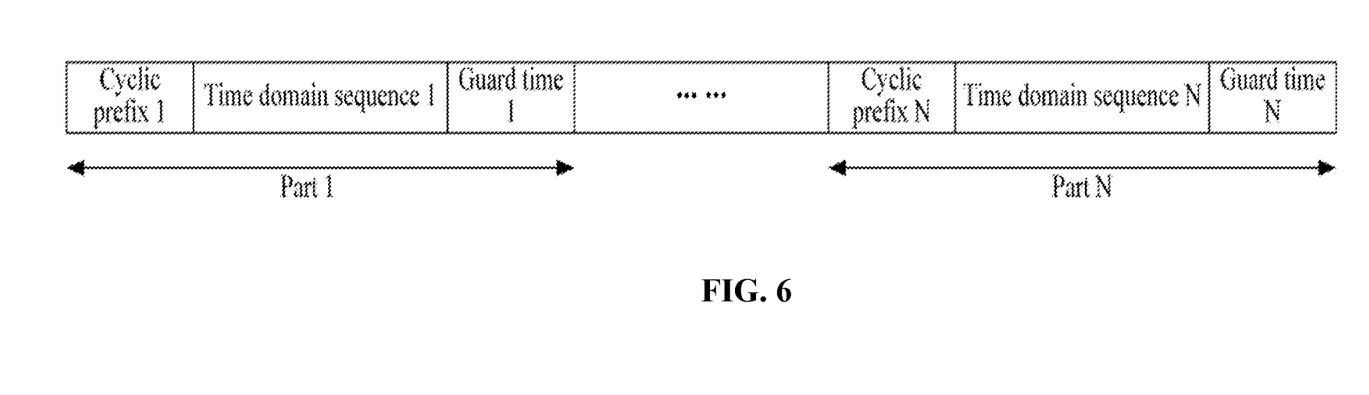
FIG. 6 is a structural diagram one of a random access preamble according to an embodiment of the present disclosure.

In a wireless communication system, the base station configures the resource used for sending a random access message. The random access message at least includes a Preamble. As shown in FIG. 6, the Preamble is composed of N parts. Each part includes a cyclic prefix, a time domain sequence and a guard time.

The configuration schemes of time domain sequences (time domain sequence 1~time domain sequence N) in the N parts are configured by the base station or are configured by default or are configured by a standard default. When the random access massage further includes a data packet in addition to the Preamble, the configuration schemes of time domain sequences (time domain sequence 1~time domain sequence N) in the N parts are different from the configuration schemes of time domain sequences (time domain sequence 1~time domain sequence N) in the N parts when the random access message includes only the Preamble, or the configuration schemes in above two conditions are independently configured.

In this embodiment, when the random access massage sent by the terminal further includes a data packet in addition to the Preamble, the terminal selects a sequence combination (e.g., time domain sequence 1-1~time domain sequence N-1) from the configuration schemes of time domain sequences (time domain sequence 1~time domain sequence N) allocated in this condition.

When the base station detects the sequence combinations (time domain sequence 1~time domain sequence N), the base station continues to detect the data packet sent by the terminal.

When the base station knows that the sequence combinations sent by the terminal is (time domain sequence 1-1~time domain sequence N-1) through the detected sequence combinations according to a default rule or a predetermined rule, the base station continues to detect the data packet sent by the terminal.

Figure 7:
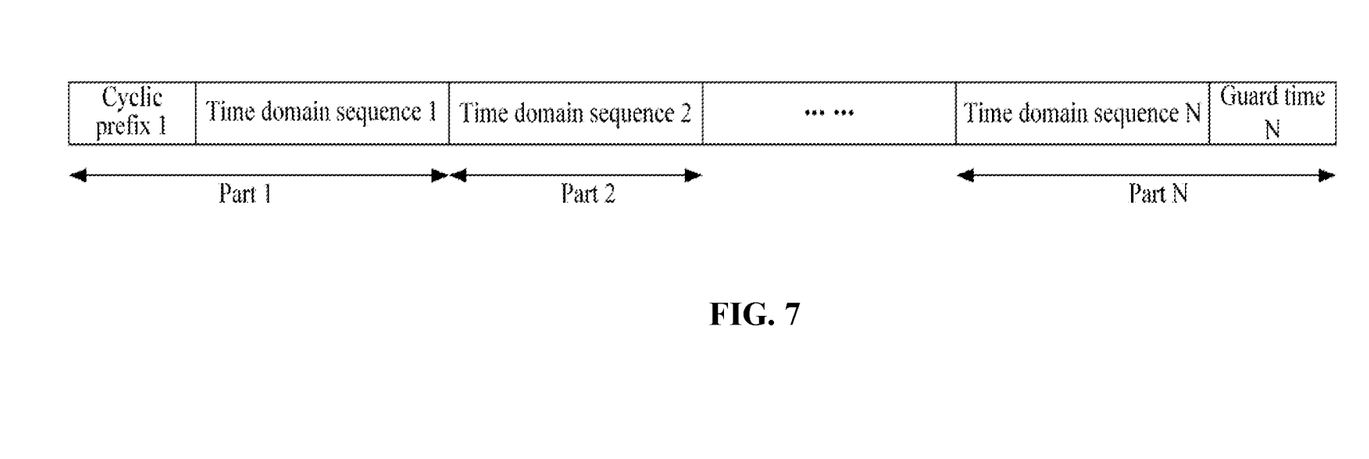
FIG. 7 is a structural diagram two of a random access preamble according to an embodiment of the present disclosure.

In an embodiment, in the N parts of the Preamble, except a cyclic prefix 1 in the part 1 and the guard time N in the part N, cyclic prefixes and guard times in all other parts do not have configuration, as shown in FIG. 7.

Embodiment 4

In a wireless communication system, the base station configures the resource used for sending a random access message. The random access message at least includes a Preamble. As shown in FIG. 6, the Preamble is composed of N parts. Each part includes a cyclic prefix, a time domain sequence and a guard time. The time domain sequence in each part may be generated according to a random access sequence selected by the terminal and a default rule. The random access sequence is selected from the random access sequence set. The random access sequence set is configured by the base station or is configured by a standard default. The random access sequences used for generating time domain sequences in different parts may be the same or different.

The random access sequences used for generating time domain sequences in the N parts may be Seq1~SeqN. When the random access massage further includes a data packet in addition to the Preamble, the configuration schemes of the Seq1~SeqN are different from the configuration schemes of the Seq1~SeqN when the random access message includes only the Preamble, or the configuration schemes in above two conditions are independently configured.

In this embodiment, when the random access massage sent by the terminal further includes a data packet in addition to the Preamble, the terminal selects a sequence combination (e.g., Seq1-1~SeqN-1) from the configuration schemes of the Seq1~SeqN allocated for this condition.

When the base station detects the sequence combination (Seq1-1~SeqN-1), the base station continues to detect the data packet sent by the terminal. When the base station knows that the sequence combinations sent by the terminal are (Seq1-1~SeqN-1) through the detected sequence combinations according to a default rule or a predetermined rule, the base station continues to detect the data packet sent by the terminal.

In an embodiment, in the N parts of the Preamble, except a cyclic prefix 1 in the part 1 and the guard time N in the part N, cyclic prefixes and guard times in all other parts do not have configuration, as shown in FIG. 7.

Embodiment 5

Figure 8:
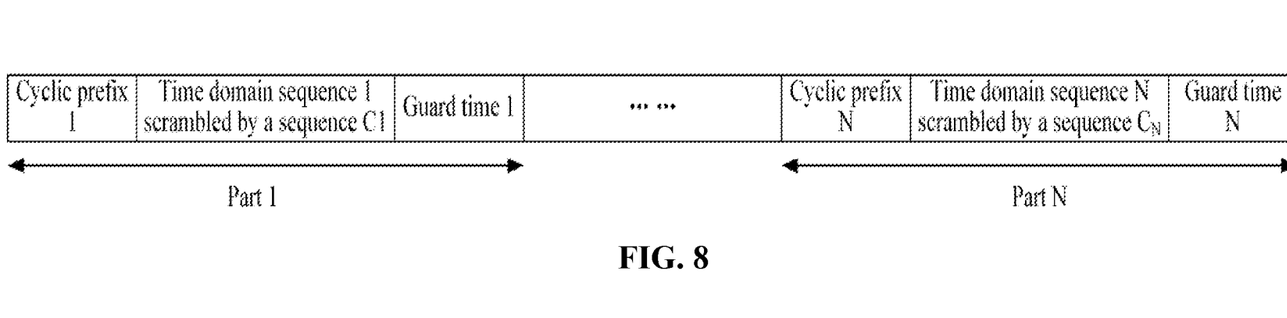
FIG. 8 is a structural diagram three of a random access preamble according to an embodiment of the present disclosure.

In a wireless communication system, the base station configures the resource used for sending a random access message. The random access message at least includes a Preamble. As shown in FIG. 8, the Preamble is composed of N parts. Each part includes a cyclic prefix, a time domain sequence and a guard time.

The configuration schemes of time domain sequences (TimeSequence) (e.g., TimeSequence(1)~TimeSequence (N)) in the N parts are configured by the base station or are configured by default or are configured by a standard default. The TimeSequence in each part is obtained by scrambling a sequence. That is, the TimeSequence 1 of the part 1 is a sequence obtained by scrambling the sequence C(1), and so on, and the TimeSequence N of the part N is a sequence obtained by scrambling the sequence C(N).

When the random access massage further includes a data packet in addition to the Preamble, the configuration schemes of scrambled sequences (C(1)~C(N)) in the N parts are different from the configuration schemes of scrambled sequences (C(1)~C(N)) in the N parts when the random access message includes only the Preamble, or the configuration schemes in above two conditions are independently configured.

In this embodiment, when the random access massage sent by the terminal further includes a data packet in addition to the Preamble, the terminal selects a sequence combination from the configuration schemes of scrambled sequences (C(1)~C(N)) allocated for this condition.

In this embodiment, the step in which the TimeSequence in each part is obtained by scrambling the sequence may include a following formula.

$$\text{TimeSequence}(i,j) = \text{Sequence}(i,j) \oplus C(i,j)$$

The $\oplus$ is an exclusive or operator; the Sequence(i, j) is the j-th element of the Sequence(i) that needs to be scrambled in the i-th part; the C(i, j) is the j-th element of the scrambled sequence C(i) in the i-th part; and the random access sequence generating the Sequence(i) is the Seq(i), and in this embodiment, the Seq(i) generates the Sequence(i) according to a default rule or a predetermined rule.

After the base station is descrambled through sequences (C(1)~C(N)), the base station continues to detect the data packet sent by the terminal when successfully detecting the Sequence(1)~Sequence(N).

Embodiment 6

Figure 9:
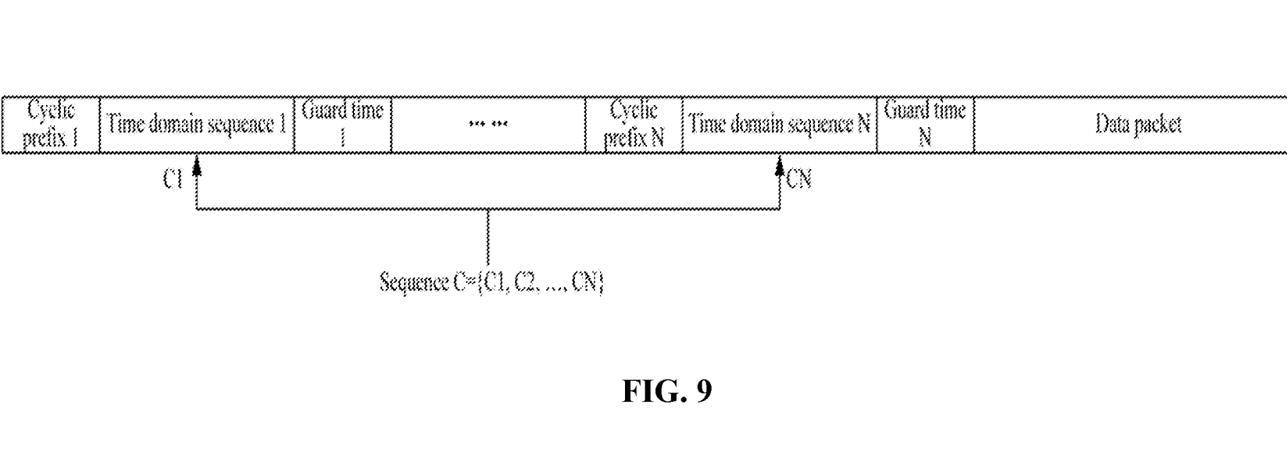
FIG. 9 is a structural diagram four of a random access preamble according to an embodiment of the present disclosure.

In a wireless communication system, the base station configures the resource used for sending a random access message. The random access message at least includes a Preamble. As shown in FIG. 9, the Preamble is composed of N parts. Each part includes a cyclic prefix, a time domain sequence and a guard time.

The configuration schemes of time domain sequences (TimeSequence) (e.g., TimeSequence(1)~TimeSequence (N)) in the N parts are configured by the base station or are configured by default or are configured by a standard default. In this embodiment, the TimeSequence(i) in the i-th part is generated through the following formula.

$$\text{TimeSequence}(i,j) = \text{Sequence}(i,j) \times C(i,j)$$

The Sequence(i, j) is the j-th element in the Sequence(i), and in this embodiment, the Seq(i) generates the Sequence(i) according to a default rule or a predetermined rule; and the C(i) is the i-th element in the sequence C.

When the random access massage further includes a data packet in addition to the Preamble, the configuration scheme of the sequence C is different from the configuration scheme of the sequence C when the random access message includes only the Preamble, or the configuration schemes in above two conditions are independently configured.

In this embodiment, when the random access massage sent by the terminal further includes a data packet in addition to the Preamble, the terminal selects a sequence from the configuration schemes of the sequence C allocated for this condition.

When the base station successfully detects the sequence C and Sequence(1)~Sequence(N), the base station continues to detect the data packet sent by the terminal.

In an embodiment, when the base station successfully detects the Sequence(1)~Sequence(N), the base station continues to detect the data packet sent by the terminal.

In an embodiment, when the base station successfully detects the sequence C, the base station continues to detect the data packet sent by the terminal.

Embodiment 7

In a wireless communication system, the base station configures the resource used for sending a random access message. The random access message at least includes a Preamble. As shown in FIG. 6, the Preamble is composed of N parts. Each part includes a cyclic prefix, a time domain sequence and a guard time.

The configuration schemes of time domain sequences (TimeSequence) (e.g., TimeSequence(1)~TimeSequence (N)) in the N parts are configured by the base station or are configured by default or are configured by a standard default. In this embodiment, the TimeSequence(i) in the i-th part is generated by the sequence $\widetilde{Seq(i)}$ according to a default rule or a predetermined rule, and the $\widetilde{Seq}(i, j)$ is generated according to the following formula.

$$\widetilde{Seq}(i,j) = \text{Seq}(i,j) \times C(i)$$

The Seq(i, j) is the j-th element in the Seq(i), and the C(i) is the i-th element in the sequence C.

When the random access massage further includes a data packet in addition to the Preamble, the configuration scheme of the sequence C is different from the configuration scheme of the sequence C when the random access message includes only the Preamble, or the configuration schemes in above two conditions are independently configured.

In this embodiment, when the random access massage sent by the terminal further includes a data packet in addition to the Preamble, the terminal selects a sequence from the configuration schemes of the sequence C allocated for this condition.

When the base station successfully detects the sequence C and Seq(1)~Seq(N), the base station continues to detect the data packet sent by the terminal.

In an embodiment, when the base station successfully detects the Seq(1)~Seq(N), the base station continues to detect the data packet sent by the terminal.

In an embodiment, when the base station successfully detects the sequence C, the base station continues to detect the data packet sent by the terminal.

Figure 4:
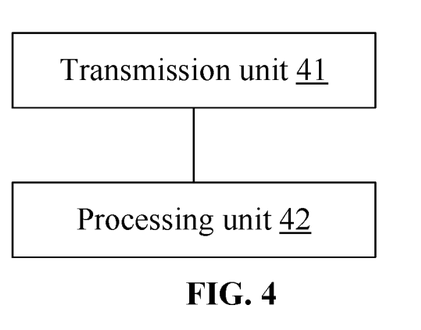
FIG. 4 is a structural diagram of a message sending device according to an embodiment of the present disclosure.

FIG. 4 is a structural diagram of a message sending device according to an embodiment of the present disclosure. As shown in FIG. 4, the device includes a transmission unit 41.

The transmission unit 41 is configured to send a message to a second node, where the message includes at least one of a first reference or a data packet signal. The first reference signal is carried on a first resource, and the data packet is carried on a second resource.

The first reference signal belongs to a first reference signal set, and the first resource belongs to a first resource set; the second resource belongs to a second resource set; and the first resource set and the second resource set have a gap in a time domain, and a value of the gap is greater than or equal to 0.

In an embodiment, before the first node sends the message to the second node, a step described below is further included.

A gap between the first resource set and the second resource set is configured in the time domain.

The gap between the first resource set and the second resource set in the time domain is configured through at least one of following manners: configured by the first node, configured by the second node, configured according to a predetermined rule or configured by default.

In an embodiment, the device further includes a configuration module. The configuration module is configured to, before the first node sends the message to the second node, execute at least one of following operations.

One or more of the first reference signal sets are configured, where the one or more first reference signal sets are configured through at least one of following manners: configured by the first node, configured by the second node, configured by default or configured according to a predetermined rule.

One or more of the first resource sets are configured, where the one or more first resource sets are configured through at least one of following manners: configured by the first node, configured by the second node, configured by default or configured according to a predetermined rule.

One or more of the second resource sets are configured, where the one or more second resource sets are configured through at least one of following manners: configured by the first node, configured by the second node, configured by default or configured according to a predetermined rule.

In an embodiment, the configuration of the gap satisfies at least one of conditions described below.

Gaps corresponding to different first resource sets and the second resource sets in the time domain are independently configured.

When multiple first reference signals sent on the first resources belong to different first reference signal sets, gaps corresponding to the first resource sets and multiple second resource sets in the time domain are independently configured.

When multiple first resources carrying the first reference signals belong to the same first resource set and the sent first reference signals carried by multiple first resources belongs to different first reference signal sets, gaps corresponding to multiple first resource sets and the second resource sets in the time domain are independently configured.

When the sent first reference signals belong to the same first reference signal set and the multiple first recourses carrying the first reference signals belong to different first resource sets, gaps corresponding to different first resource sets and the second resource sets in the time domain are independently configured.

In an embodiment, the device further includes a processing unit 42.

The processing unit 42 is configured to execute at least one of following operations: determining location information of the second resource in the second resource set according to the first reference signal in the first reference signal set or index information of the first reference signal; or determining location information of the second resource set according to index information of the first reference signal set.

In an embodiment, there is a relationship mapping between the first reference signal in the first reference signal set or the index information of the first reference signal and the second resource in the second resource set.

The processing unit 42 is configured to determine the location information of the second resource in the second resource set through the first reference signal or the index information of the first reference signal according to the mapping relationship.

In an embodiment, the first reference signal set and the second resource set have a mapping relationship.

The processing unit 42 is configured to determine the location information of the second resource set through the index information of the first reference signal set according to the mapping relationship.

In an embodiment, the first reference signal includes in the time domain: more than one cyclic prefixes and more than one time domain sequences; or more than one cyclic prefixes, more than one time domain sequences and more than one guard times.

In an embodiment, a length of the gap is K1 time units, K1≥0, where the time unit includes at least one of:
  a first time unit, where the first time unit includes A1 milliseconds, A1>0;
  a second time unit, where the second time unit includes A2 microseconds, A2>0;
  a third time unit, where the third time unit includes A3 nanoseconds, A3>0;
  a fourth time unit, where the fourth time unit includes a length of B1 time domain symbols, B1>0, where a subcarrier spacing corresponding to the time domain symbol is F1, F1>0; or
  a fifth time unit, where the fifth time unit includes C1 slot lengths, C1>0, where a subcarrier gap corresponding to a time domain symbol in the slot length is F2, F2>0.

In an embodiment, a value of the F1 or the F2 is configured through at least one of following manners: configured by the second node, configured by default, configured by the first node or configured according to a predetermined rule.

In an embodiment, the F1 or the F2 is configured as 15000 Hz.

In an embodiment, when the first reference signal includes a guard time in the time domain, if a value of the guard time is greater than or equal to a first threshold, a value of the K1 is 0.

In an embodiment, when the first reference signal includes a guard time in the time domain, if a value of the guard time is less than or equal to a second threshold, a value of the K1 is greater than 0.

In an embodiment, the value of the K1 is determined according to at least one of: a value of the guard time, a value range of the guard time or a sending format of the first reference signal.

In an embodiment, the message further includes a second reference signal. The second reference signal is configured to perform at least one of:
  indicating whether the message comprises the data packet; or
  serving as a decoding pilot of the data packet.

In an embodiment, the second reference signal is selected according to at least one of:
  the first reference signal set;
  an index of the first reference signal set;
  a first reference signal in the first reference signal set or an index of the first reference signal;
  the first resource set;
  an index of the first resource set; or
  a first resource location in the first resource set or the index information of the first resource.

In an embodiment, a resource carrying the second reference signal is in the second resource.

In an embodiment, the time domain sequence is obtained by scrambling a first sequence through a second sequence, or the time domain sequence is obtained by multiplying the first sequence and the second sequence.

In an embodiment, the first sequence is at least generated by the third sequence according to a default rule or a predetermined rule.

In an embodiment, the third sequence is a random access sequence.

In an embodiment, when the message includes the first reference signal and the data packet, a configuration scheme of the second sequence is different from a configuration scheme of the second sequence when the message includes only the first reference signal.

Alternatively, when the message includes the first reference signal and the data packet, a configuration scheme of the second sequence and a configuration scheme of the second sequence when the message includes only the first reference signal are independently configured.

In an embodiment, the time domain sequence is generated by a fourth sequence according to a default rule or a predetermined rule.

In an embodiment, the fourth sequence is obtained by scrambling a fifth sequence through a sixth sequence, or the fourth sequence is obtained by multiplying the fifth sequence and the sixth sequence.

In an embodiment, the fifth sequence is a random access sequence.

In an embodiment, when the message includes the first reference signal and the data packet, a configuration scheme of the sixth sequence is different from a configuration scheme of the sixth sequence when the message includes only the first reference signal.

Alternatively, when the message includes the first reference signal and the data packet, a configuration scheme of the sixth sequence and a configuration scheme of the sixth sequence when the message includes only the first reference signal are independently configured.

In an embodiment, the time domain sequence is obtained by scrambling a first sequence through a second sequence, or the time domain sequence is obtained by multiplying the first sequence and the second sequence, or the time domain sequence is the first sequence.

In an embodiment, the first sequence is at least generated by the third sequence according to a default rule or a predetermined rule.

In an embodiment, the third sequence is a random access sequence.

In an embodiment, when the message includes the first reference signal and the data packet, a configuration scheme of the first sequence is different from a configuration scheme of the first sequence when the message includes only the first reference signal.

Alternatively, when the message includes the first reference signal and the data packet, a configuration scheme of the first sequence and a configuration scheme of the first sequence when the message includes only the first reference signal are independently configured.

In an embodiment, the device is disposed in the first node, the first node is a terminal, and the second node is a base station or a transmission node.

In an embodiment, the message is a random access message.

Implementation of functions of each unit of the message sending device shown in FIG. 4 may be understood with reference to the relevant description of the foregoing message sending method.

Generally, only after the terminal accesses the base station and the base station allocates the resource to the terminal, the terminal may perform traffic data interaction with the base station. For a low-power-consumption and high-connection scenario, for example for traffics of discontinuous sending of some small data packets, after the terminal performs related operations of system access, the base station allocates resources to complete traffic sending or receiving. In this process, the problem that the resource overhead in the traffic ending or receiving process is smaller than the resource overhead in the access process may possibly occur. The message sending device provided by this embodiment may implement resource allocation in the system access process, and enable the data transmission to be performed in the access process, thereby improving the data transmission efficiency. For example, in the implementation process of the access of the terminal to the base station, the resource is allocated to the terminal, so as to implement the traffic data sending and receiving of the terminal.

Figure 5:
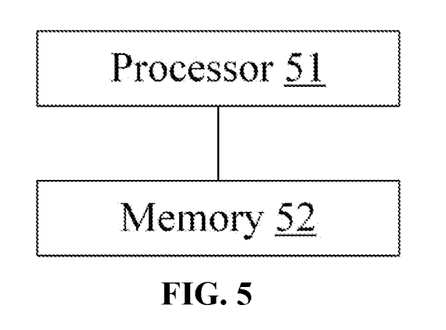
FIG. 5 is a structural diagram of an electronic device according to an embodiment of the present disclosure.

In addition, the present disclosure further provides an electronic device. As shown in FIG. 5, the electronic device includes a processor 51 and a memory 52 storing computer-executable instructions. When the computer-executable instructions are executed by the processor 51, the processor 51 is configured to execute a following operation.

A message is sent to a second node, where the message includes at least one of: a first reference signal or a data packet. The first reference signal is carried on a first resource, and the data packet is carried on a second resource.

The first reference signal belongs to a first reference signal set, and the first resource belongs to a first resource set; the second resource belongs to a second resource set; and the first resource set and the second resource set have a gap in a time domain, and a value of the gap is greater than or equal to 0.

In an embodiment, before the first node sends the message to the second node, a step described below is further included.

A gap between the first resource set and the second resource set in the time domain is configured. The gap between the first resource set and the second resource set in the time domain is configured through at least one of following manners: configured by the electronic device, configured by the second node, configured according to a predetermined rule or configured by default.

In an embodiment, before the first node sends the message to the second node, steps described below are further included.

One or more of the first reference signal sets are configured, where the one or more first reference signal sets are configured through at least one of following manners: configured by the electronic device, configured by the second node, configured by default or configured according to a predetermined rule.

One or more of the first resource sets are configured, where the one or more first resource sets are configured through at least one of following manners: configured by the electronic device, configured by the second node, configured by default or configured according to a predetermined rule.

One or more of the second resource sets are configured, where the one or more second resource sets are configured through at least one of following manners: configured by the electronic device, configured by the second node, configured by default or configured according to a predetermined rule.

In an embodiment, the processor 51 is further configured to execute at least one of following operations.

Location information of the second resource in the second resource set is determined according to the first reference signal in the first reference signal set or index information of the first reference signal.

The location information of the second resource set is determined according to the index information of the first reference signal set.

In an embodiment, the first reference signal includes in the time domain: more than one cyclic prefixes and more than one time domain sequences; or more than one cyclic prefixes, more than one time domain sequences and more than one guard times.

In an embodiment, a length of the gap is K1 time units, K1≥0, where the time unit includes at least one of:
- a first time unit, where the first time unit includes A1 milliseconds, A1>0;
- a second time unit, where the second time unit includes A2 microseconds, A2>0;
- a third time unit, where the third time unit includes A3 nanoseconds, A3>0;
- a fourth time unit, where the fourth time unit includes a length of B1 time domain symbols, B1>0, where a subcarrier spacing corresponding to the time domain symbol is F1, F1>0; or
- a fifth time unit, where the fifth time unit includes C1 slot lengths, C1>0, where a subcarrier spacing corresponding to a time domain symbol in the slot length is F2, F2>0.

In an embodiment, the message further includes a second reference signal. The second reference signal is configured to perform at least one of:
- indicating whether the message comprises the data packet; or
- serving as a decoding pilot of the data packet.

The operations executed by the above electronic device are merely examples, and the electronic device of this embodiment may execute all steps in the message sending method. The embodiments of the present disclosure may be provided as methods, systems or computer program products. Therefore, the present disclosure may be implemented by hardware, software, or a combination of hardware and software. In addition, the present disclosure may take the form of a computer program product implemented in one or more computer-usable storage media (including, but not limited to, a disk memory and an optical memory) that includes computer-usable program codes.

Accordingly, the present disclosure further provides a computer storage medium, which is configured to store computer-executable instructions for executing any step of the message sending method in the above embodiments.

The present disclosure is described with reference to flowcharts and/or block diagrams of methods, devices (systems) and computer program products provided by the above embodiments. The computer program instructions can be used to implement each flow and/or block in the flowcharts and/or block diagrams and a combination of flows and/or blocks in the flowcharts and/or block diagrams. These computer program instructions can be provided to a processor of a general purpose computer, special purpose computer, embedded processor, or another programmable data processing device to produce a machine, so as to enable instructions executed by a processor of a computer or another programmable data processing device to generate an apparatus for implementing the functions specified in one or more flows in the flowcharts and/or one or more blocks in the block diagrams.

These computer program instructions can also be stored in a computer-readable memory which can direct the computer or other programmable data processing device to operate in a particular manner, so that the instructions stored in the computer-readable memory produce a manufactured product including an instruction means. The instruction means implements the functions specified in one or more flows in the flowcharts and/or one or more blocks in the block diagrams.

These computer program instructions may also be loaded onto the computer or another programmable data processing device so that a series of operation steps are performed on the computer or another programmable device to produce processing implemented by the computer. Therefore, instructions executed on the computer or another programmable device provide steps for implementing the functions specified in one or more flows in the flowcharts and/or one or more blocks in the block diagrams.

INDUSTRIAL APPLICABILITY

The message sending method and device and the electronic device provided by the present disclosure may effectively reduce the time delay in the access process and improve the data transmission efficiency.

What is claimed is:

1. A message sending method, comprising:
sending, by a first node, a message to a second node, wherein the message comprises at least one of: a first reference signal carried on a first resource, or a data packet carried on a second resource;

wherein the first reference signal belongs to a first reference signal set, and the first resource belongs to a first resource set; the second resource belongs to a second resource set; and the first resource set and the second resource set have a gap in a time domain, and a value of the gap is greater than or equal to 0;

wherein before sending, by the first node, the message to the second node, the method further comprises:

configuring the gap between the first resource set and the second resource set in the time domain; and wherein the configuration of the gap satisfies at least one of following conditions:

a gap between each first resource set and the corresponding second resource set in the time domain is independently configured;

in a case where a plurality of the first reference signals sent on first resources belong to different first reference signal sets, gaps between first resource sets to which the first resources belong and a plurality of second resource sets in the time domain are independently configured;

in a case where a plurality of the first resources carrying the plurality of first reference signals belong to a same first resource set and the plurality of first reference signals belong to different first reference signal sets, gaps between first resource sets and the corresponding second resource sets in the time domain are independently configured; or in a case where sent first reference signals belong to a same first reference signal set and a plurality of the first recourses carrying the first reference signals belong to different first resource sets, gaps between first resource sets and the corresponding second resource sets in the time domain are independently configured.

2. The method of claim 1,
wherein the gap between the first resource set and the second resource set in the time domain is configured through at least one of following manners: configured by the first node, configured by the second node, configured according to a predetermined rule or configured by default.

3. The method of claim 1, wherein before sending, by the first node, the message to the second node, the method further comprises:

configuring one or more first reference signal sets; wherein the one or more first reference signal sets are configured through at least one of following manners: configured by the first node, configured by the second node, configured by default or configured according to a predetermined rule;

configuring one or more first resource sets; wherein the one or more first resource sets are configured through at least one of following manners: configured by the first node, configured by the second node, configured by default or configured according to a predetermined rule; and configuring one or more second resource sets; wherein the one or more second resource sets are configured through at least one of following manners: configured by the first node, configured by the second node, configured by default or configured according to a predetermined rule.

4. The method of claim 1, wherein before sending, by the first node, the message to the second node, the method further comprises at least one of:

determining location information of the second resource in the second resource set according to the first reference signal in the first reference signal set or index information of the first reference signal; or determining location information of the second resource set according to index information of the first reference signal set.

5. The method of claim 4, wherein there is a mapping relationship between the first reference signal in the first reference signal set or the index information of the first reference signal and the second resource in the second resource set; and determining the location information of the second resource in the second resource set according to the first reference signal in the first reference signal set or the index information of the first reference signal comprises:

according to the mapping relationship, determining the location information of the second resource in the second resource set through the first reference signal in the first reference signal set or the index information of the first reference signal.

6. The method of claim 4, wherein there is a mapping relationship between the first reference signal set and the second resource set; and determining the location information of the second resource set according to the index information of the first reference signal set comprises:

according to the mapping relationship, determining the location information of the second resource set through the index information of the first reference signal set.

7. The method of claim 1, wherein the first reference signal comprises following contents in the time domain:

at least one cyclic prefix and at least one time domain sequence; or at least one cyclic prefix, at least one time domain sequence and at least one guard time.

8. The method of claim 1, wherein a length of the gap is K1 time units, K1≥0, wherein a time unit comprises at least one of:

a first time unit, wherein the first time unit comprises A1 milliseconds, A1>0;

a second time unit, wherein the second time unit comprises A2 microseconds, A2>0;

a third time unit, wherein the third time unit comprises A3 nanoseconds, A3>0;

a fourth time unit, wherein the fourth time unit comprises a length of B1 time domain symbols, B1>0, and wherein a subcarrier spacing corresponding to time domain symbols is F1, F1>0; or a fifth time unit, wherein the fifth time unit comprises C1 slot lengths, C1>0, wherein a subcarrier spacing corresponding to time domain symbols in the slot length is F2, F2>0.

9. The method of claim 8, wherein
in response to determining that the first reference signal comprises a guard time in the time domain and a value of the guard time is greater than or equal to a first threshold, a value of K1 is 0; or in response to determining that the first reference signal comprises a guard time in the time domain and a value of the guard time is less than or equal to a second threshold, a value of K1 is greater than 0.

10. The method of claim 1, wherein the message further comprises a second reference signal, wherein the second reference signal is configured to perform at least one of:

indicating whether the message comprises the data packet; or serving as a decoding pilot of the data packet.

11. The method of claim 10, wherein the second reference signal is selected according to at least one of:
the first reference signal set;
an index of the first reference signal set;
the first reference signal in the first reference signal set or an index of the first reference signal;
the first resource set;
an index of the first resource set; or
a first resource location in the first resource set or an index information of the first resource.

12. The method of claim 7, wherein the time domain sequence is obtained by scrambling a first sequence through a second sequence, or the time domain sequence is obtained by multiplying the first sequence and the second sequence, or the time domain sequence is the first sequence.

13. The method of claim 12, wherein
a configuration scheme of the second sequence corresponding to a case that the message comprises the first reference signal and the data packet is different from a configuration scheme of the second sequence corresponding to a case that the message comprises only the first reference signal; or
a configuration scheme of the second sequence corresponding to a case that the message comprises the first reference signal and the data packet and a configuration scheme of the second sequence corresponding to a case that the message comprises only the first reference signal are independently configured respectively.

14. The method of claim 7, wherein the time domain sequence is generated by a fourth sequence according to a default rule or a predetermined rule.

15. The method of claim 14, wherein the fourth sequence is obtained by scrambling a fifth sequence through a sixth sequence, or the fourth sequence is obtained by multiplying the fifth sequence and the sixth sequence.

16. The method of claim 15, wherein a configuration scheme of the sixth sequence corresponding to a case that the message comprises the first reference signal and the data packet is different from a configuration scheme of the sixth sequence corresponding to a case that the message comprises only the first reference signal; or
a configuration scheme of the sixth sequence corresponding to a case that the message comprises the first reference signal and the data packet and a configuration scheme of the sixth sequence corresponding to a case that the message comprises only the first reference signal are independently configured respectively.

17. The method of claim 12, wherein
a configuration scheme of the first sequence corresponding to a case that the message comprises the first reference signal and the data packet is different from a configuration scheme of the first sequence corresponding to a case that the message comprises only the first reference signal; or
a configuration scheme of the first sequence corresponding to a case that the message comprises the first reference signal and the data packet and a configuration scheme of the first sequence corresponding to a case that the message comprises only the first reference signal are independently configured.

18. An electronic device, comprising a processor and a memory storing computer-executable instructions, wherein when the computer-executable instructions are executed by the processor, the processor is configured to execute following operations:
sending a message to a second node, wherein the message comprises at least one of: a first reference signal carried on a first resource, or a data packet carried on a second resource;
wherein the first reference signal belongs to a first reference signal set, and the first resource belongs to a first resource set; the second resource belongs to a second resource set; and the first resource set and the second resource set have a gap in a time domain, and a value of the gap is greater than or equal to 0;
wherein before sending, by the first node, the message to the second node, the method further comprises:
configuring the gap between the first resource set and the second resource set in the time domain; and
wherein the configuration of the gap satisfies at least one of following conditions:
a gap between each first resource set and the corresponding second resource set in the time domain is independently configured;
in a case where a plurality of the first reference signals sent on first resources belong to different first reference signal sets, gaps between first resource sets to which the first resources belong and a plurality of second resource sets in the time domain are independently configured;
in a case where a plurality of the first resources carrying the plurality of first reference signals belong to a same first resource set and the plurality of first reference signals belong to different first reference signal sets, gaps between first resource sets and the corresponding second resource sets in the time domain are independently configured; or
in a case where sent first reference signals belong to a same first reference signal set and a plurality of the first recourses carrying the first reference signals belong to different first resource sets, gaps between first resource sets and the corresponding second resource sets in the time domain are independently configured.

19. A non-transitory computer-readable storage medium, which is configured to store computer-executable instructions for executing the method of any one of claim 1.

20. A message sending method, comprising:
sending, by a first node, a message to a second node, wherein the message comprises at least one of: a first reference signal carried on a first resource, or a data packet carried on a second resource;
wherein the first reference signal belongs to a first reference signal set, and the first resource belongs to a first resource set; the second resource belongs to a second resource set; and the first resource set and the second resource set have a gap in a time domain, and a value of the gap is greater than or equal to 0;
wherein before sending, by the first node, the message to the second node, the method further comprises:
configuring the gap between the first resource set and the second resource set in the time domain; and
wherein the configuration of the gap satisfies at least one of following conditions:
in a case where a plurality of the first reference signals sent on first resources belong to different first reference signal sets, gaps between first resource sets to which the first resources belong and a plurality of second resource sets in the time domain are independently configured;
in a case where a plurality of the first resources carrying the plurality of first reference signals belong to a same first resource set and the plurality of first reference signals belong to different first reference signal sets, gaps between first resource sets and the corresponding second resource sets in the time domain are independently configured; or in a case where sent first reference signals belong to a same first reference signal set and a plurality of the first recourses carrying the first reference signals belong to different first resource sets, gaps between first resource sets and the corresponding second resource sets in the time domain are independently configured.

\* \* \* \* \*